United States Patent
Augusto et al.

(10) Patent No.: US 7,115,963 B2
(45) Date of Patent: Oct. 3, 2006

(54) CIRCUITRY FOR IMAGE SENSORS WITH AVALANCHE PHOTODIODES

(75) Inventors: Carlos J. R. P. Augusto, San Jose, CA (US); Pedro N. C. Diniz, Cerritos, CA (US)

(73) Assignee: Quantum Semiconductor LLC, San Jose, CA (US)

( * ) Notice: Subject to any disclaimer, the term of this patent is extended or adjusted under 35 U.S.C. 154(b) by 0 days.

(21) Appl. No.: 11/142,177

(22) Filed: Jun. 1, 2005

(65) Prior Publication Data

US 2005/0224903 A1    Oct. 13, 2005

Related U.S. Application Data

(63) Continuation of application No. PCT/EP03/13947, filed on Dec. 9, 2003.

(60) Provisional application No. 60/431,691, filed on Dec. 9, 2002.

(51) Int. Cl.
*H01L 31/00* (2006.01)

(52) U.S. Cl. .............................. 257/440; 257/E31.001
(58) Field of Classification Search ................ 257/440, 257/438

See application file for complete search history.

(56) References Cited

U.S. PATENT DOCUMENTS 6,858,912 B1 *   2/2005   Marshall et al. ............ 257/438

FOREIGN PATENT DOCUMENTS

| EP | 1006591 | 6/2000 |
|----|---------|--------|
| JP | 9008744 | 5/1997 |
| JP | 11 055194 | 5/1999 |

* cited by examiner

*Primary Examiner*—Roy Potter
(74) *Attorney, Agent, or Firm*—Sturm & Fix LLP (57) ABSTRACT

In-pixel circuit architectures for CMOS image sensors are disclosed, which are suitable for avalanche photo-diodes operating either in linear or in non-linear mode. These architectures apply in particular to photo-diodes and image sensors in which CMOS devices are fabricated on thin-film silicon-on-insulator substrates.

2 Claims, 8 Drawing Sheets

CIRCUITRY FOR IMAGE SENSORS WITH AVALANCHE PHOTODIODES

CROSS REFERENCE TO RELATED APPLICATIONS

This application is a Continuation application of PCT/EP2003/013947 filed Dec. 9, 2003, claiming priority of U.S. Patent Application No. 60/431,691, filed Dec. 9, 2002, which are included in their entirety by reference made hereto.

BACKGROUND OF THE INVENTION

The present invention relates to system architecture and circuit design of CMOS image sensors. In particular, it is applies to, but it is not restricted to, the photo-detectors and image-sensors described in WO 02/033755.

The performance and functionality of CMOS image sensors depend on the physics of the photo-detection, the modes of operation of the photo-diodes, the in-pixel circuitry, in-pixel circuitry, the circuitry at the periphery, and the interconnects between sensor matrix and the periphery.

WO 02/033755 introduces a process technology that enables Avalanche Photo-Diodes (APDs) to be tightly integrated with CMOS devices for image sensor matrices. Because the active layers of the APDs are epitaxially grown on the substrates, there is the possibility to have optimal doping and heterojunction profiles using silicon-based, such as silicon-germanium (SiGe) and silicon-germanium-carbon (SiGeC), random alloys and superlattices. The epitaxial growth of the active layers allows the fabrication of Separated Absorption and Multiplication Avalanche Photo-Detectors (SAM-APDs), which are perceived to be the photo-diode design that provides the best performance.

The epitaxial growth of the photo-diode layer enables the fabrication of CMOS image sensors on substrates other than bulk silicon wafers, such as Silicon-On-Insulator, including Thin-Film SOI It should be realized that conventional CMOS image sensors cannot be fabricated on TF-SOI because:

1. The crystalline silicon film on top of the buried oxide is too thin to provide useful photo-absorption,
2. In TF-SOI the source/drain-to-well junction, used as the photodiode in conventional CMOS image sensors, does not exist.

In addition to being the substrate of choice of deep sub-90 nm CMOS devices, with undisputed advantages over bulk substrates/devices, in terms of speed, power dissipation, density of integration, radiation hardness, etc., TF-SOI enable back-side illuminated CMOS image sensors by removing the silicon wafer underneath the buried oxide, and replacing it with a transparent substrate, such as quartz, sapphire, quartz, glass, plastic, etc.

Back-side illumination offers a few unique capabilities to CMOS image sensors, because on the front-side of the wafer, the area above the photo-diode in each pixel no longer needs to be free of opaque materials. Therefore the following become possible:

1. Dense mesh of metal interconnects over the area of the pixels and photo-diodes;
2. In-pixel capacitors, homo-/hetero-junction or MOS capacitors, can be made over the layers of the photo-diodes, thereby avoiding any area penalty;
3. In-pixel MIM capacitors made during the fabrication of dense interconnects over the pixel areas;
4. Light no longer has to travel through the dielectric layers embedded in the metallization stack, thereby removing constrains on the materials, layout, and overall thickness of the metal stack;
5. Without constraints related to image sensing, the number of metal levels used or the fabrication of the CMOS image sensors can be the maximum available to the particular CMOS generation being used. Typically, conventional CMOS image sensors are fabricated with fewer metal levels than a purely electrical circuit made with the same CMOS technology, because of the constraints on the height of the metallization stack.

Another invention disclosed in a co-pending international application, and designated as Surface Plasmon Polariton (SPP) Light-Funnel, is a new device that considerably changes a few important parameters of image sensors. A matrix of SPP Light-Funnel elements, or SPP pixels, is positioned at the image plane of the lens. Each SPP Light-Funnel gathers light from a certain area, that defines the size of the SPP Pixel, and "funnels it" into a much smaller area, without loss or diffraction. The small cross-section of a SPP Light-Funnel is positioned very near the corresponding photo-diode, which needs to have a surface only slightly larger than the "narrow" region of the Light-Funnel.

The SPP Light-Funnels provide the following possibilities:

1. Light gathered from a certain area, can be forced down to a cross-section much smaller than the wavelength of light, without loss or diffraction.
2. The "narrow" region of a Light-Funnel forces the light into the corresponding photo-diode.
3. The area of the photo-diode can be reduced to only slightly larger than the cross-section of the narrow region of the Light-Funnel, thereby reducing the dark current, without loosing input signal. This results in increased signal-to-noise ratio.
4. The size of the SPP Pixel at the image plane of the lens determines the size of the "Sensor Pixel".
5. The amount of light coupled into the photo-diode by the Light-Funnel is independent of the size of the photo-diode, thereby providing a constant 100% Fill Factor.
6. Reducing the size of the photo-diode, decreases dark current, and provides extra area for CMOS devices, without decreasing the Fill Factor.
7. Reducing the size of the photo-diode improves the yield of the epitaxial growth process used to fabricate the photo-diodes.
8. Light-coupling mechanism of the SPP Light-Funnel prevents crosstalk between adjacent pixels originated by photons impinging with very oblique paths.

SUMMARY OF THE INVENTION

An first object of the present invention is a in-pixel circuit architecture for APDs operating in the linear regime that takes advantage of a large number of in-pixel CMOS devices without loss of Fill Factor.

A second object of the present invention is an in-pixel circuit architecture for APDs operating in the non-linear regime, also known as Geiger mode, that takes advantage of a large number of in-pixel CMOS devices without loss of Fill Factor.

A third object of the present invention is a first circuit architecture to take advantage of dense interconnects between in-pixel circuitry and peripheral circuitry of the sensor matrix.

A fourth object of the present invention is a second circuit architecture to take advantage of dense interconnects between in-pixel circuitry and peripheral circuitry of the sensor matrix.

The fifth object of the present invention is a third circuit architecture to take advantage of dense interconnects between in-pixel circuitry and peripheral circuitry of the sensor matrix.

DESCRIPTION OF EXEMPLARY
EMBODIMENTS OF THE INVENTION

Advanced In-Pixel Circuitry

Avalanche Photo-Diodes (APDs) can be operated in modes not available to the photo-diodes used in conventional CMOS image sensors.

The operation of APDs in the linear mode provides a built-in analog amplification of the photo-generated signal. The magnitude of the amplification or "multiplication" can be increased by increasing the applied voltage. The amplitude of the photo-current is proportional to the number of electron-hole pairs absorbed in the photo-diode. A junction operated in the avalanche mode, or photo-current mode, does not act as a storage node, as it is the case with the pn-junction photo-diodes used in conventional CMOS image sensors, which are operated in the photo-voltaic mode. The Geiger mode is non-linear because the applied bias is so large that regardless of the number of absorbed photons, the gain is such that the absorption of a single photon leads to an immediate current saturation. This is why this mode is also called the "single photon-counting" mode. This mode is especially suited for extremely weak illumination conditions, and to signal the instant of photo-detection.

The CMOS devices directly controlling, and handling the output of the photo-diodes can be arranged into circuits that handle the photo-current in two fundamentally different ways, namely:

1) Conversion of the detected photo-current amplitude to digital values;
2) Conversion of the detected photo-current frequency to digital values;

Both cases can be implemented for an asynchronous tracking of the input signal, in which case, both require "in-pixel" counters. Transforming amplitude into digital values requires fairly conventional circuitry such as a comparator, in addition to the transistors required to control the APD itself as well as transistors for the counters. On the other hand, transforming frequency into digital values does not require a comparator, and it is accomplished by feeding the sequence of pulses the APD generates (already in digital form) to a digital counter. Therefore, frequency-to-digital conversion or photon-to-digital conversion is much more compact, and does not suffer from readout noise and quantization errors associated with amplitude-to-digital conversion.

In-Pixel Circuitry for Avalanche Photo-Diodes (APDs) Operating in the Linear Mode Provided that a sufficiently large number of CMOS devices can be made inside a pixel, higher degrees of sophistication can be added to the operation of the image sensors. In particular, for image sensors with Electronic Global Shutter (EGS), and pixels having APDs operated in the linear mode, it is highly desirable to control the avalanche gain independently for each pixel.

Figure 1:
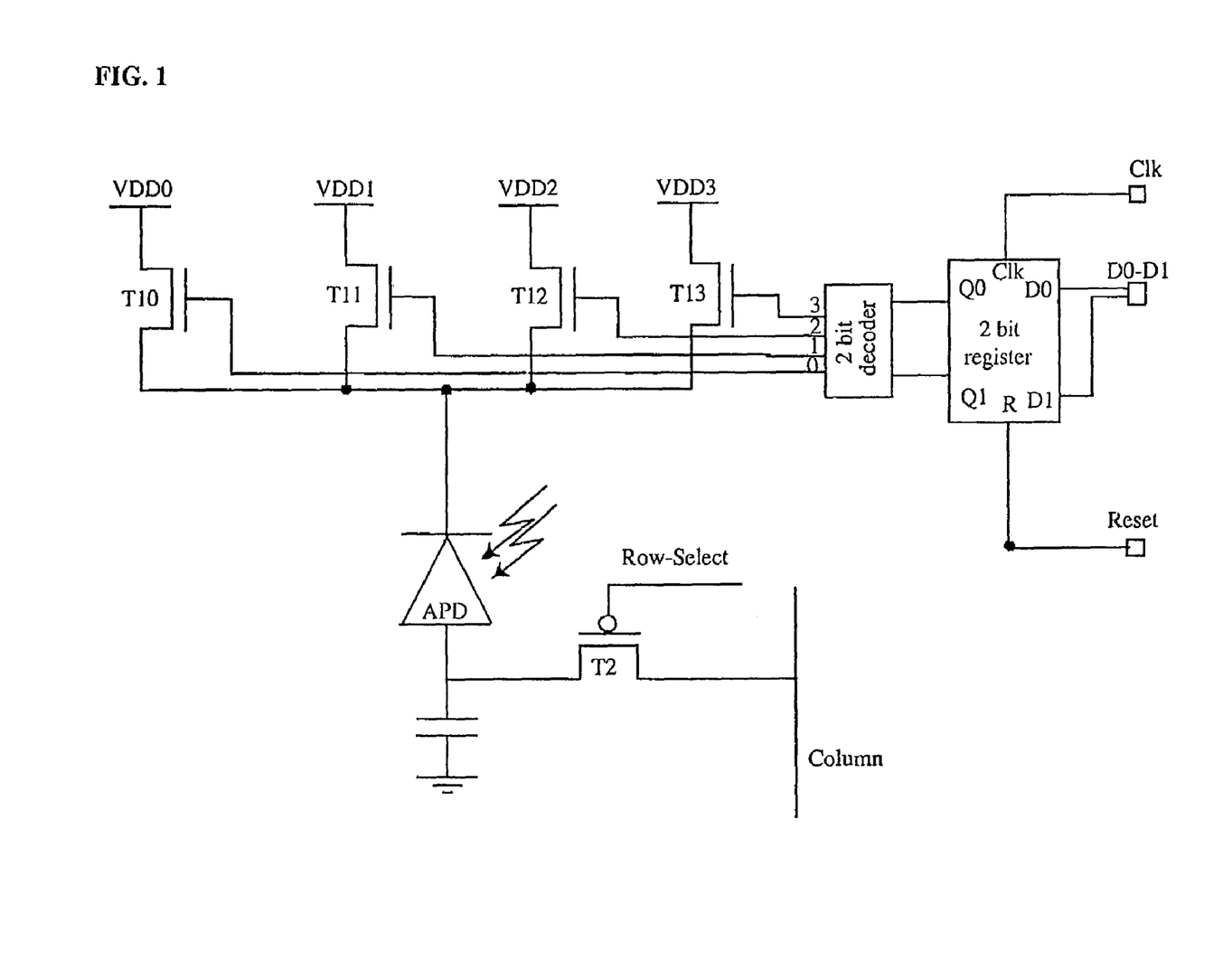
FIG. 1 shows how multiple gain factors for the APD can be implemented, by adding more pass-transistors connecting the top terminal of the APD and metal lines with different potential levels.

The avalanche gain is very sensitive on the applied voltage, and for that reason it is also highly desirable to have several different stable voltage sources, which are linked to the a terminal of the photo-diode through pass transistors that can be selected according to the illumination conditions. Then it becomes possible to select high avalanche gain for weaker light intensity, and select weaker gain for stronger light intensity, and thus handle a much larger dynamic range than otherwise possible, leading to a reduced loss of information across an entire image. The information about which gain (which voltage) the photo-diode is operating under when a given image is captured can be appended to the bits with the binary values describing the information about the primary colors. FIG. 1 shows how multiple gain factors for the APD can be implemented, by adding more pass-transistors connecting the top terminal of the APD and metal lines with different potential levels. The extra pass-transistors would be placed in parallel with T1, and only one would be turned on at a time. With multiple voltage levels, the gate of T2 would be controlled separately from T1 or any of the other pass-transistors.

In-Pixel Circuitry for Avalanche Photo-Diodes (APDs) operating in the Geiger node The Geiger mode, because of its extremely large gain factor, requires quenching of the current in order to prevent permanent damage to the photo-diode from overheating. Quenching can be done with passive or active circuits. Active quenching consists in resetting the photo-diode immediately after the current has risen to high levels, subsequent to the absorption of one or more photons by the photo-diode. The resetting signal must be triggered o accomplish two tasks:

a) Electrical short of both terminals of the photo-diode, thus bringing the current to zero;
b) Re-establish the "stand-by" setting at the photo-diode, having an applied voltage and low "dark current", ready for the detection of the next photon(s).

The maximum frequency of detection is dependent on the speed of the physical phenomena inside the photo-diode as well as the speed of switching of the circuitry associated with the photo-diode. The maximum frequency of detection provides the upper limit to the number of photons that can be counted by the photodiode per unit of time, and thus the maximum dynamic range possible to detect with a given APD & associated circuitry.

Figure 2:
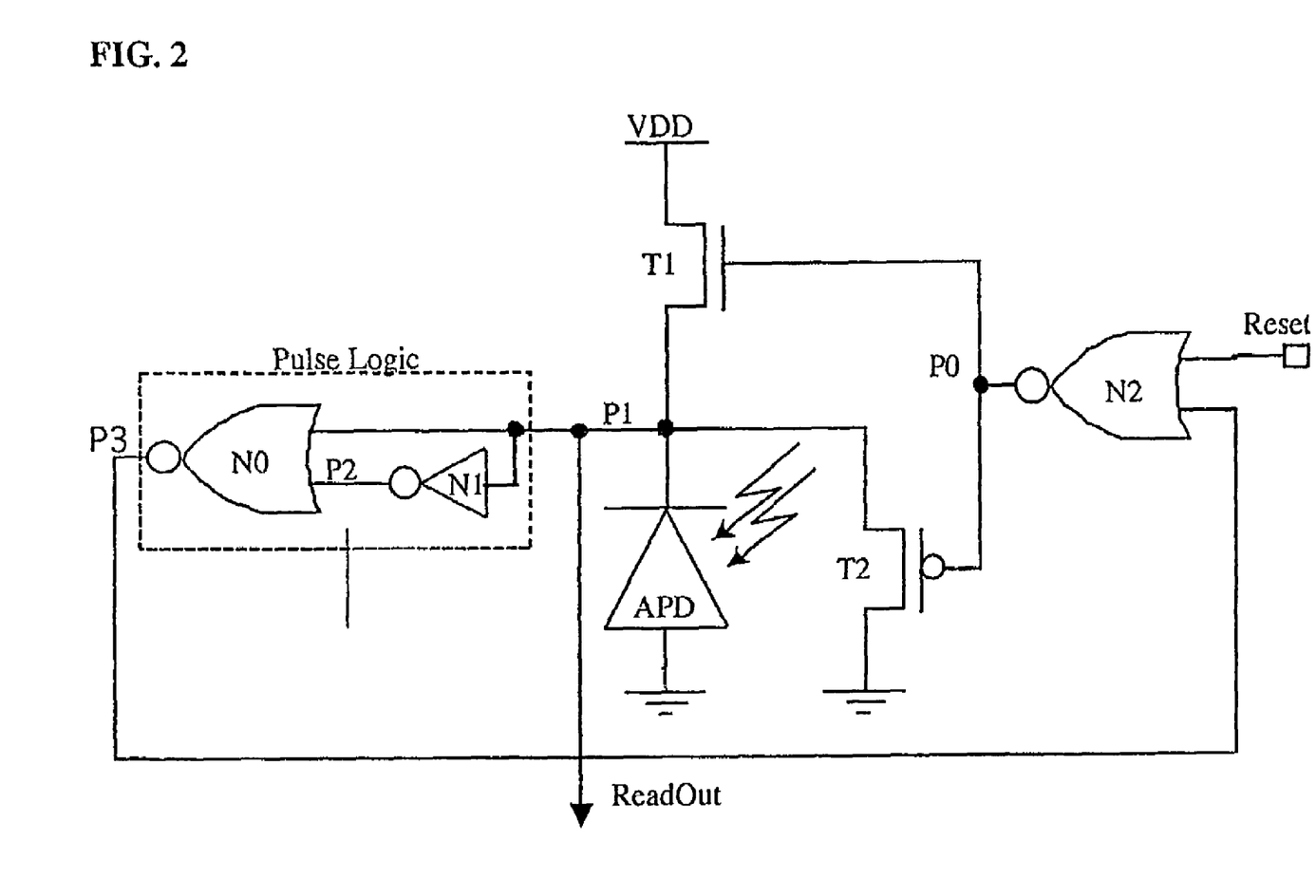
FIG. 2 shows the "in-pixel" circuitry that operates in "frequency of detection" mode, and the corresponding circuitry for the resetting of the photo-diode (after a first detection), ending with the photo-diode in "stand-by", ready for the next detection

FIG. 2 shows the "in-pixel" circuitry that operates in "frequency of detection" mode, and the corresponding circuitry for the resetting of the photo-diode (after a first detection), ending with the photo-diode in "stand-by", ready for the next detection. The various elements of this circuit as well as specific points P0, P1, P2 and P3, have been labeled. In this architecture there are two transistors T1 and T2 to control the voltage supply to the APD, and which are controlled themselves by the NOR gate N2. At the output of the APD there is a "pulse-logic" circuit composed by the NOR N0 gate and a NOT gate N1.

Figure 3:
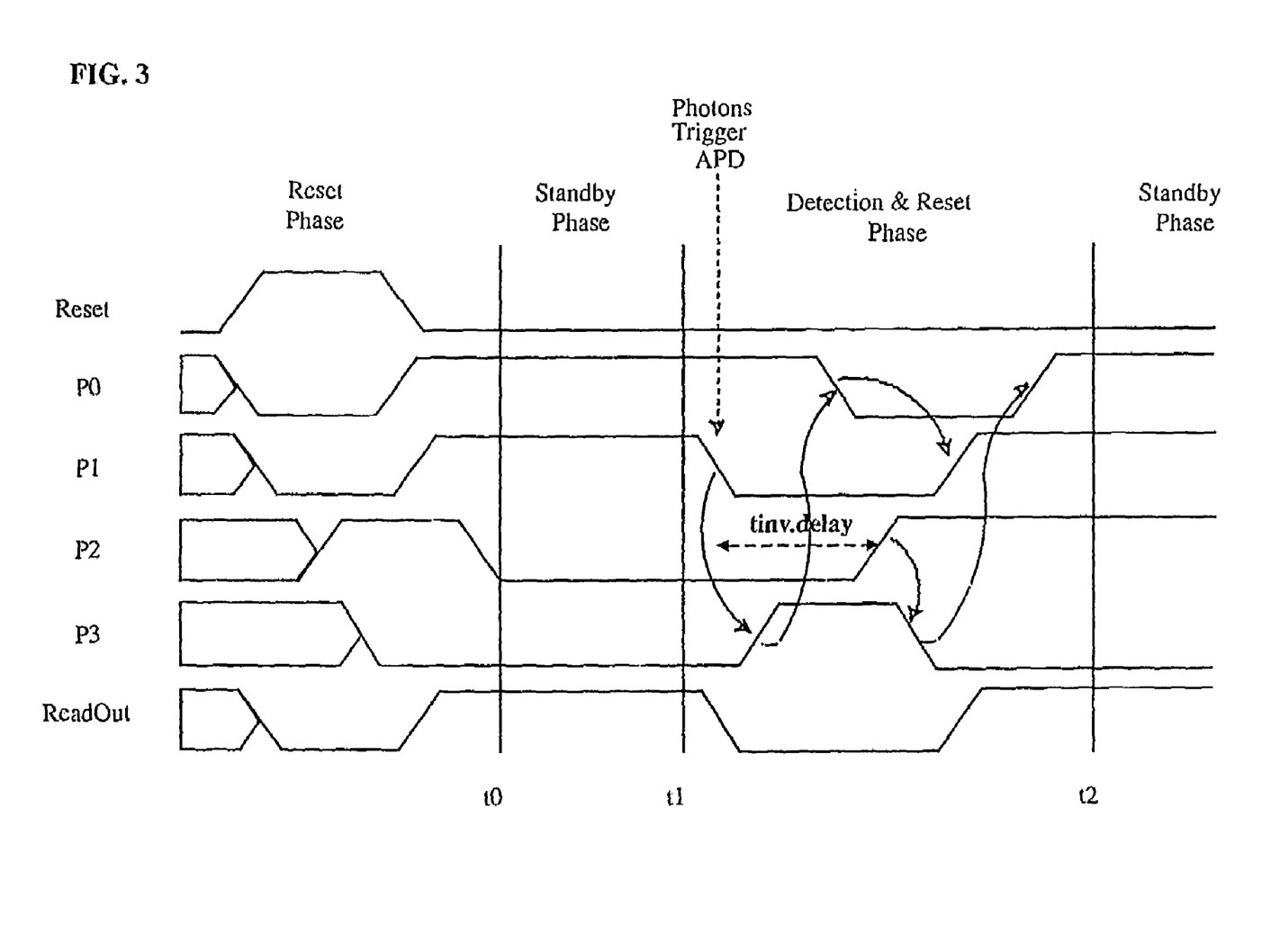
FIG. 3 shows the Timing Diagram for Reset, Standby, Detection & Reset Phases of Operation of the circuit handling the output and controlling the Geiger APD.

FIG. 3 shows the Timing Diagram for Reset, Standby, Detection & Reset Phases of Operation of the circuit handling the output and controlling the Geiger APD.

Figure 4:
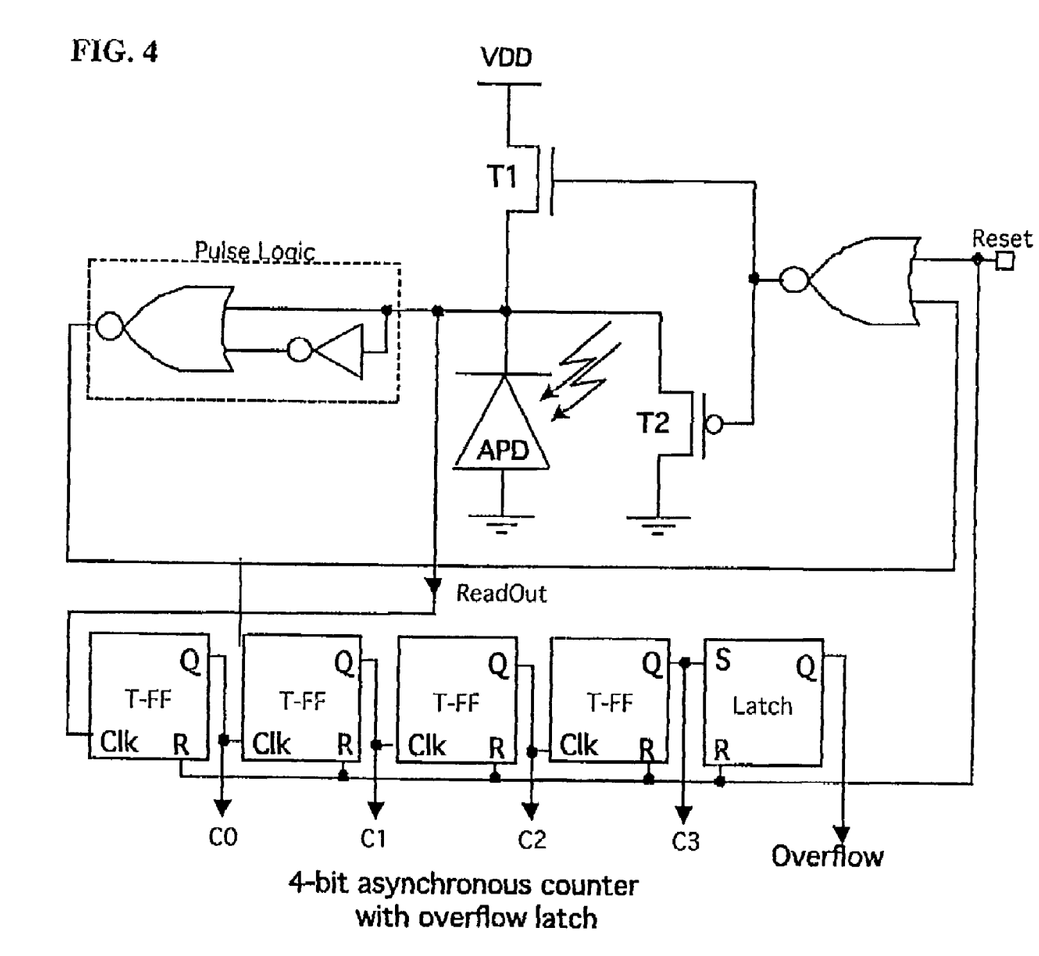
FIG. 4 shows the circuit of FIG. 2, plus the in-pixel counters, which for this particular example are depicted with a 4-bit depth. Different bit-depths are possible.

FIG. 4 shows the circuit of FIG. 2, plus the in-pixel counters, which for this particular example are depicted with a 4-bit depth. Different bit-depths are possible.

Information about time of arrival of photons does not require any additional circuitry to the circuitry that is shown in FIGS. 2 and 4. Essentially a clock at the periphery stops when the detection of the first photons occurs. This feature can be implemented for every color pixel, or for example, for the group of pixels under each PDCU. It is anticipated that in actual applications it will be sufficient to measure the time of flight in only one of the subpixels that constitute a full color pixel.

For a color pixel composed of Red, Green, Blue, and Infra-Red separate subpixels, it should be sufficient to measure the time of flight in only one of those subpixels, for example the Infra-Red one.

For "In-Pixel" circuitry operating on a source signal that is the frequency of detection, rather than the amplitude of the detected photons, definitions such as Dynamic Range (DR), Signal to Noise Ratio (SNR), Saturation, etc., can also be defined in analogous ways to those definitions applied to amplitude signals.

In amplitude signals, saturation can occur when the potential well formed by the pn-junctions becomes full, i.e. when it cannot hold any more charges, or when the storage capacitor has also reached full capacity for the operating voltage, or when the quantization process does not have enough bits to describe the analog signal. For a frequency signal, the saturation can be defined as the rate of detection at which the reset loop operates at its maximum frequency.

In amplitude signals, the Dynamic Range is defined as the maximum amount of charge captured during one sampling period that does not reach saturation, divided by the noise or dark current, i.e., charges that are generated without the absorption of photons. In frequency signals, the Dynamic Range is defined as the maximum frequency of the reset loop before saturation, divided by the shutter frequency (the inverse of time during which photons can be absorbed, which is also known as shutter time window).

Geiger APDs have a digital, hence noiseless, readout. However, the high sensitivity of Geiger APDs can lead to false detection. This is a form of noise that is caused, for example, by physical defects in the device layers. Since defectivity is exponentially dependent on the area of devices, APDs with reduced area should have fewer false counts. On the other hand it is impossible to know if a given detection was caused by one or more photons absorbed simultaneously. Increasing the time-resolution of photo-detection, i.e., reducing the reset time, which is the same to say, increasing the maximum frequency of operation reduces the probability of not detecting multiple photons that are absorbed in a short period of time.

Architectures for Dense Interconnects between "In-Pixel" and Peripheral Circuitry As already mentioned, back-side illuminated image sensors, with dense interconnects over the pixel areas on the front-side of the substrate, enable readout schemes which are very different from the "by row" or "by column" addressing used in conventional CMCS image sensors.

One alternative scheme requires that inside the sensor matrix, pixels to be organized in groups or cells, that area controlled by a logic unit called the Pixel Digital Control Unit (PDCU). The number of the pixels under each PDCU, the size of the pixels, the number and pitch of the metallization levels are such that, each PDCU has a number of metal lines to communicate with the periphery that are not shared with any other PDCU. Other metal lines connecting the sensor to the periphery area shared amongst all pixels and all PDCU. Examples of shared lines are, GND, possibly several VDD lines carrying different voltage levels, a system clock.

With the availability of dense interconnects over the sensor areas, the PDCUs can be fabricated in a distributed way, i.e., some transistors are physically located in regions that belong to a pixel while other transistors area located in another pixel, while operating as a single entity.

Figure 5:
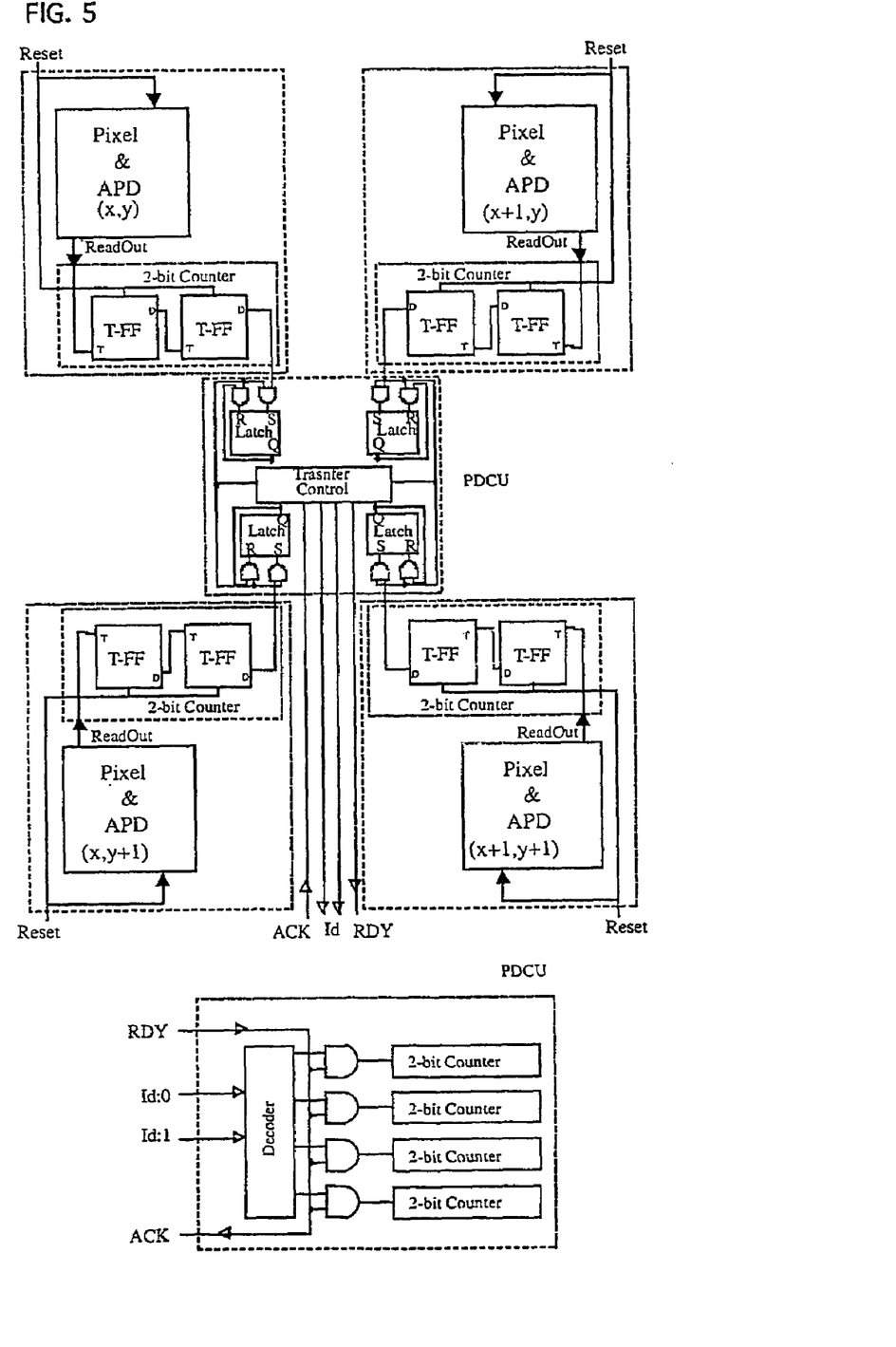
FIG. 5 shows one example of a Pixel Digital Control Unit (PDCU), which for sake of simplicity of the drawings shows only 4 pixels, with 2-bit counters.
Figure 7:
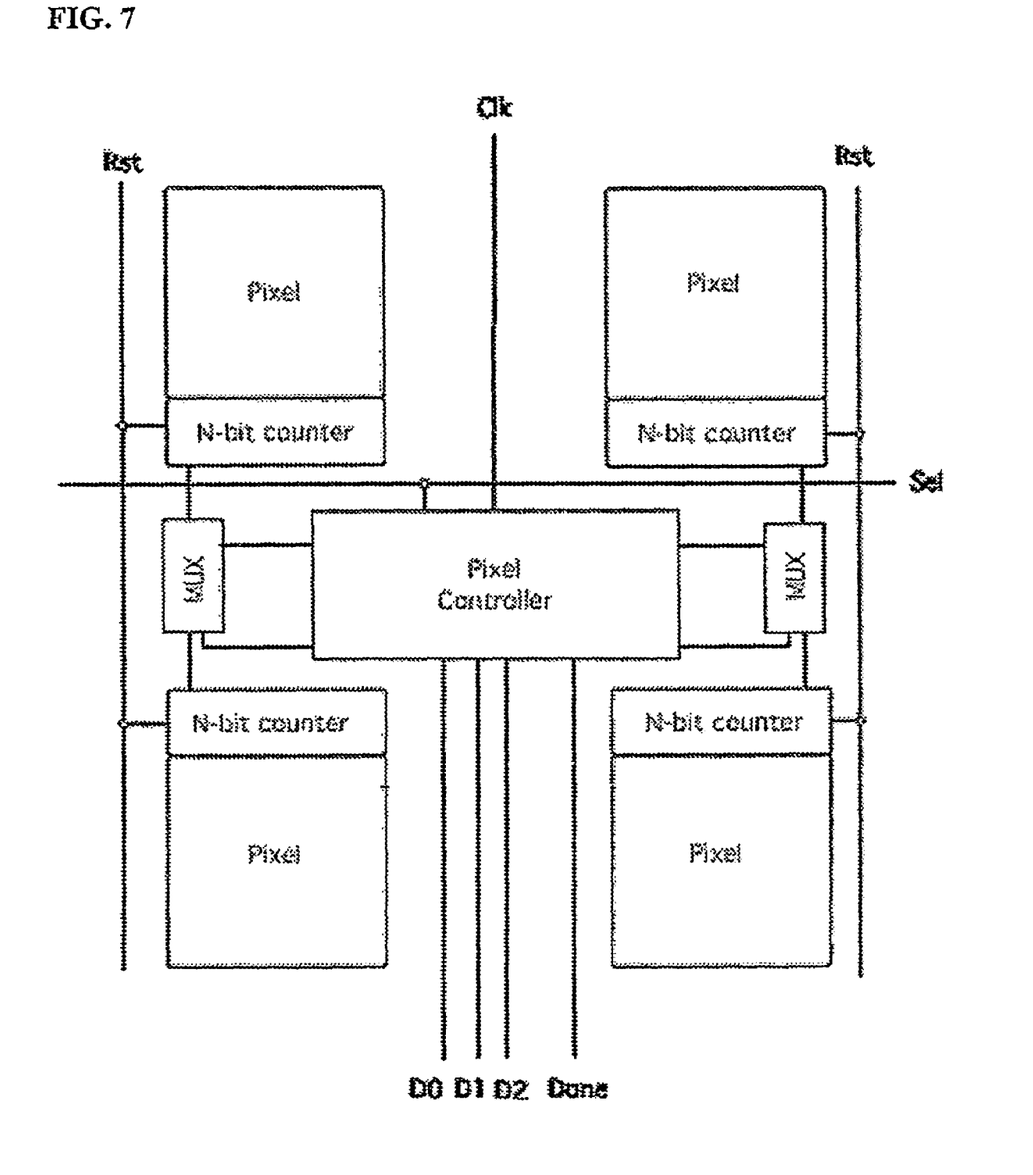
FIG. 7 depicts the minimal connections between a Pixel Digital Control Unit (PDCU) and a set of pixels it controls to the extent of transferring the data in the pixel's counters to a periphery circuit and assuming 3 lines for data and 1 line for control (i.e., using a 4 line track).

FIG. 5 shows one example of a Pixel Digital Control Unit (PDCU), which for sake of simplicity of the drawings shows only 4 pixels, with 2-bit counters. It describes how the binary signal from each pixel is multiplexed over a single metal line to the periphery. This mode of operation will be described below, along with a possible variant in which more than one bit is transferred simultaneously over a wider number of parallel lines as depicted in FIG. 7. Protocols based on the system-wide clock identify, at any point in time, the pixel to which the data is being sent.

Protocols based on the system-wide clock identify, at any point in time, the pixel to which the data is being sent.

Ideally each pixel would have its PDCU, with direct connections to the periphery. That may become possible with future CMOS technology that will provide the means to make all the necessary transistors inside each pixel and still have the required area for photo-detection, and interconnects (electrical and/or optical) between the pixels and the periphery.

Description of "Control"

Figure 6:
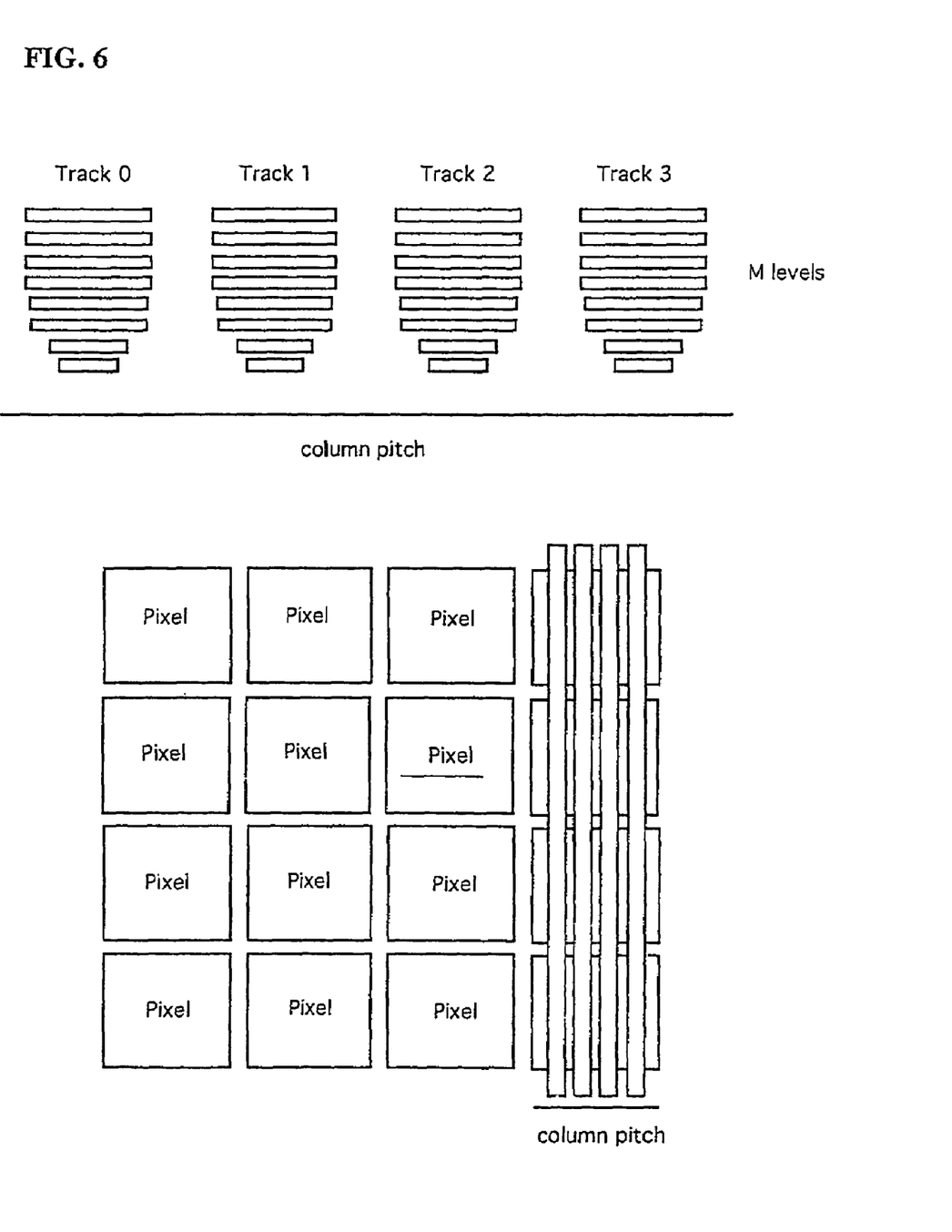
FIG. 6 shows the illustration of the dense interconnect arranged by columns where each track consists of a finite number of stacked metallic lines (top of the figure). This figure also shows the arrangement of the tracks overlaying the area of the pixels and laid out column-wise.

On the assumption that the image sensor has a number M of metal levels, and that over the area of a single pixel, it is possible to have a number P of metal lines, hereafter referred to as "tracks", belonging to any of the M metal levels. FIG. 6 shows the arrangement for M=8 and P=4. With this physical interconnect capability it is possible to devise several strategies for the control and data flow between the individual pixels inside the sensor matrix, and the circuitry at the periphery of the sensor matrix.

The underlying assumption in the following description is that associated with each pixel there is a N bit digital counter which in itself can be associated at all times with the pixel, or can be time-multiplexed between a group of G pixels.

In transferring the data from the pixels to the periphery of the sensor matrix, it is assumed that there is a digital controller that is organized around a set of pixels covering a given section of the sensor. The set of pixels is a small matrix of X×Y=G, which could have a single digital counter for the G-number of pixels.

The "tracks" on the same column pitch will need to be shared between many controllers. If C is the number of pixels per column of the sensor matrix, R is the number of pixels per row, there are C/(2×) controllers per column, assuming a splitting of column into two banks, upper and lower. Each of column-controller must control X×Y=G pixels. Given that each controller can use the column area of Y pixels, then each column controller can in effect use up to Y×P tracks of M lines each. Therefore, C/(2×) controllers must share a total of Y×P tracks.

For example, with C=2048 and R=2048, assuming X=4 and Y=4, there would be 256 controllers per half-column Each of the 256 controllers would share 4×4 tracks of M=8 lines each.

The sharing of the lines by each set of controllers in a given half-column lines can be accomplished in fundamentally three ways, namely:

1. The controllers compete for the entire set of tracks—Free Spatial and Temporal Assignment;
2. The controllers compete for a regular partition of the sets of tracks, for instance every $K^{th}$ controller can only attempt to use track "i"—Regular Spatial but Free Temporal Assignment;
3. The controllers do not compete, but rather follow a rigid communication pattern controlled from the periphery that dictates when should they use the shared resources would be used, and which controller uses them (typically a set defined by their positioning the column)—Regular Spatial and Free Temporal Assignment.

Each alternative has advantages and disadvantages. Whereas the first option allows for fully unconstrained assignment of controllers to "tracks", it comes at the cost of time and complexity. Controllers must cooperatively agree on the utilization of the "tracks". The data that needs to be transmitted to the periphery must be adequately identified so that it can be stored in the appropriate memory position. The single most important advantage is that only the controllers that need to transmit data need to cooperate. This is particularly relevant, and perhaps the ideal arrangement for low-lighting conditions, because some pixels will have captured photons while other have not.

The second scheme is a compromise between the first and the third schemes. Each of the C/(2 X Y P) controllers that share the same "track" must compete to acquire the exclusive access to that "track". This distributed arbitration requires shared lines, but it is clearly feasible for a reduced number of controllers. A solution could include the utilization of the lines of the shared "track" for arbitration followed by a cycle of data transfer. This is an elegant solution but requires more sophisticated controllers inside the sensor matrix. In terms of time, a distributed arbitration could be implemented easily if the M-1 of the M lines could directly encode in binary the C/(2 X Y P) controllers. The additional line could simply be used to signal the beginning of an arbitration cycle. In the subsequent cycle all of the controllers wanting to access the shared medium would set the M−1 lines with their "Id" implementing an internal wired-an operation. The controller with the lowest "Id" would win and access the medium in the third cycle. Clearly this scheme introduces a timing overhead due to the arbitration. This overhead can be significant if the amount of data transferred per arbitration is small. For the example, with the numbers mentioned above there would be M=8 and 16 controllers per "track", which are more than enough to encode the "Id" of each of the requesting controllers in 7 bits.

The third arrangement uses simple time-multiplexing within each set of controllers. An external entity, typically also controller, commands rows of controllers at a time, in which each of them will communicate with the periphery whatever values they have. The identity of each controller is implicit in the time window in which each controller is active. Clever by-pass schemes are possible despite the fact that the controller needs to advance to the next row once the slowest controller is done. The way to accomplish this "go-as-soon-as-possible" is by busy lines shared among the controllers of each row. Once each controller is done communicating its values it de-asserts thus "busy" line. The periphery controller senses when the line is de-asserted which means that all of the controllers are done and move on to the next rows. This is am alternative to a simply rigid timing scheme. Overall these schemes are the simplest to implement.

Description of "Data Transfer to the Periphery"

It will now be described the various methods of data transfer from a controller to the periphery, assuming that the assignment has been resolved using either of the control methods described previously. The data transfer methods to be described in detail are:

1. The controller scans the individual pixels in a pre-defined order transferring the entire data from each pixel to the periphery. This is the easiest method, and there is an implicit ordering for the periphery and the controllers inside the sensor matrix.
2. The controller scans the individual pixels in a pre-defined order transferring the data partially for a subset of the pixels. In the limit, this case can be used to "compress" the data transfer by encoding a number of values that are common among various pixels.
3. The controller selects the pixels with data. The selection does not follow any particular order, and transfers the data of the selected pixel to the periphery. A limit case of this scheme would be to transfer transitions of the individual pixels.

The data transfer can be either serial or in parallel. The trade-offs are clear in terms of space and time. With at least M lines per "track" one can send M-1 bits of data in a single transfer, with the extra line being used to acknowledge and synchronize the subsequent transactions. If M is small, then one can consider transferring the data in packets of smaller number of bits, requiring disassembling at the receiving end.

FIG. 5 illustrates the example in which M=4, and the controller transfers individual bits of the counter in the pixel to the counters at the periphery of the sensor matrix. In this scheme the PDCUs check which of the counters associated with each pixel has valid data and sends each of the N bits of each of the counters to the periphery, by indicating the identity of the pixel for which a valid data bit was detected. In the example in FIG. 5, the circuit is set up so that the PDCU only observes transitions of the overflow of a 2 bit counter, effectively only sending to the periphery the information about the overflow. Setting the number of bits in the pixel counters to be 0 the PDCU would be able to observe all transitions of the pixel and send then, possibly by overlapping with the transitions from other pixels, to the periphery. Because the transfer mode is asynchronous it requires two handshaking signals (ACK and RDY).

FIG. 7 illustrates a scheme where the PDCU is connected to 4 pixels, each of which have an N-bit counter. The PDCU is connected to the periphery using 4 parallel lines 3 of which it will use as data, and one forth line (named "Done") is used as control. The PDCU transfers the data for each pixel in a predefined sequence. The data for each pixel is transferred 3 bits at a time from each of the counter of the pixels. In this scheme we have opted for a Clock signal comment distributed along each column so that the pixel controller does not need to performance a handshake as required for the circuit in FIG. 5.

For each transfer of data, the PDCU divides temporally the number of N bits of each pixel counter it needs to send into packets of data 3 bits. Hence if a given pixel has 7 bits of data to be sent to the periphery, the PDCU will have to use 3 packets, P0, P1 and P2 where the two Most Significant Bits (MSB) of the P2 packet have been padded with 0 valued bits.

Figure 8:
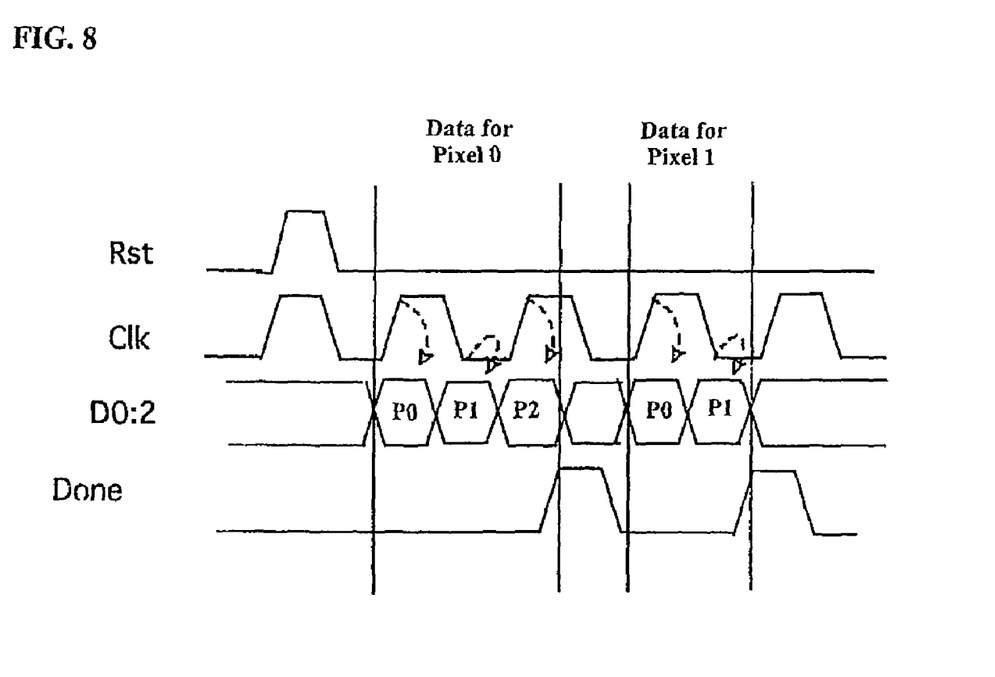
FIG. 8 shows a timing diagram illustrating the transfer of data for 2 pixel assuming the pixel and PDCU arrangement depicted in FIG. 7.

FIG. 8 illustrates a transfer for two pixels where the transfer of each packet of 3 bits occurs at each edge of the clock signal, thereby implementing a dual data rate transfer mode. For each pixel data and at the last packet transfer, the PDCU asserts the "Done" signal for a single clock, and advances to the following pixel in its ordering. This sequence proceeds until all data from all of the pixels assigned to this PDU, is transferred to the periphery. In this particular illustration the data transfer was for two pixels. Notice that because there is no explicit identification of the pixels, it is assumed that the transfer is done in a specific order, i.e., 0 through N−1 for the N pixels assigned to a given controller.

The sequencing between multiple PDCUs that share the same set of "track" lines is accomplished by a select signal, that indicates when the time-slot for the PDCU is to be active. If "Sel" is inactive, the PDCU is idle.

Description of Enhanced "Data Transfer"

In general with the increase in the capability of performing localized computation at the PDCU level, in particular for the cases where each PDCU controls a large number of pixels (with a wider area for transistors) there is the opportunity to trade-off bandwidth for computation time. Notice that the computation time can be fully overlapped as other PDCUs could be transmitting, while a given PDCU is doing a local computation. In other words, there is no time penalty for doing localized computation, as long as it can be done in the time interval that takes a single PDCU to transmit its data.

One could even extend this time interval to an entire frame by allowing the PDCU to perform computations on the data acquired during the previous frame, while the current frame is being acquired. This approach would require doubling of the local storage of the pixel counter, which would occupy a significant area. It also puts constraints on the way images are acquired.

Of particular relevance is the notion of compression, either lossy or loss-less. Besides the classical methods for compression of data, PDCUs that control spatial regions of pixels that are neighbors, could also exploit the correlation (in the absence of extremely sharp value transitions) of the values across each sub-region.

A simple lossless compression approach would be for the PDCU to subdivide the range of the N-bit counter values associated with the pixels for selected quadrants, and transmit a tally count of the each of the values that are exhibit by each range of bits in the counters for those pixels. As an example, and for a simple scheme in which the 16 bits of the counters would be partitioned into 4 ranges of 4 bits, a PDCU could find that for the most-significant-bit (MSB) all values for the pixels would be identical, e.g., 0001. In such a case, the PDCU would transfer the information saying that $^3$all top 4 MSB of the counters a have the value 001$^2$. The PDCU would then move to the next 4 bits to possibly find that only P out of Q counters have the same value. At a given point, the value of a counter would differ and the PDCU would have to transmit the data individually.

Overall these compression approaches would require more sophisticated hardware to be able to detect repeated values between the counters associated with the entire set of pixels. One can envision schemes in which the pixels associated with a given PDCU are sub-divided into groups to attempt to exploit commonality arising from the fact that close-by pixels should have similar digital values for a given frame. Another orthogonal approach would be to partition the width of the pixel counters in the ranges as outlined below and change the sizes of those partitions possibly dynamically to promote the exposure of common digital values. Common values across multiple pixel counters would lead to higher compression rates, as instead of communicating the individual values, the PDCUs would communicate a single value followed by a "occurrence frequency" number.

The invention claimed is:

1. In-pixel circuitry for CMOS image sensors, suitable for APDs operated in the linear mode, characterized by:
   (a) The first terminal of the APD is connected to a plurality of pass transistors, each connected to a different power supply;
   (b) The pass transistors have the drain connected to one terminal of the APD, source connected to a power supply, and the gate connected to a n-bit digital decoder;
   (c) Only one pass transistor is turned on, by the digital decoder at a time;
   (d) The gain or multiplication factor of the APD is controlled by voltage is applied to the APD, i.e., by which pass transistor is turned on;
   (e) The second terminal of the APD is connected to the source of the Row-Select Transistor;
   (f) The second terminal of the APD is also connected to one terminal of a capacitor;
   (g) The other terminal of the capacitor can be connected to the Ground, or connected to the first terminal of the APD, and thus be connected in series or in parallel, respectively, with the APD.

2. In-pixel circuitry for CMOS image sensors, suitable for APDs operated in the Geiger mode, characterized by:
   (a) The first terminal of the APD is connected to the common drain of two complementary pass transistors which also have a common gate electrode; The source of one pass transistor is connected to a power supply with suitable polarity to bias the APD, while the source of the other pass transistor is connected to the ground;
   (b) The second terminal of the APD is connected to the ground;
   (c) The first terminal of the APD is also connected to the input of a digital circuit block that converts a voltage transition into a voltage pulse, hence named "Pulse Logic";
   (d) The output of the "Pulse Logic" block connects to a two input NOR logic gate, whose output is connected to the common gate electrode of the two complementary pass transistors whose common drain is connected to the first terminal of the APD; The second input terminal of the 2-input NOR logic gate is connected to a reset signal;
   (e) The first terminal of the APD is also connected to the input of serial asynchronous n-bit counter.

* * * * *